United States Patent [19]

Nicholson et al.

[11] Patent Number: 4,902,431

[45] Date of Patent: *Feb. 20, 1990

[54] METHOD FOR TREATING WASTEWATER SLUDGE

[75] Inventors: John P. Nicholson, Toledo; Jeffrey C. Burnham, Maumee, both of Ohio

[73] Assignee: N-Viro Energy Systems Ltd., Toledo, Ohio

[*] Notice: The portion of the term of this patent subsequent to Nov. 1, 2005 has been disclaimed.

[21] Appl. No.: 149,575

[22] Filed: Jan. 28, 1988

[51] Int. Cl.$^4$ ............................................. C02F 11/14
[52] U.S. Cl. ................................. 210/751; 210/764; 210/916; 71/13
[58] Field of Search ............... 210/751, 758, 764, 770, 210/916; 71/13

[56] References Cited

U.S. PATENT DOCUMENTS

| | | | |
|---|---|---|---|
| 3,915,853 | 10/1975 | Luck | 210/764 X |
| 3,960,718 | 6/1976 | Lebo | 210/758 |
| 4,124,405 | 11/1978 | Quienot | 210/751 X |
| 4,230,568 | 10/1980 | Chappell | 210/751 |
| 4,514,307 | 4/1985 | Chestnut et al. | 210/751 |
| 4,541,986 | 4/1985 | Schwab et al. | 210/764 X |
| 4,781,842 | 11/1988 | Nicholson | 210/751 |

Primary Examiner—Tom Wyse
Attorney, Agent, or Firm—Barnes, Kisselle, Raisch, Choate, Whittemore & Hulbert

[57] ABSTRACT

A method of decontaminating wastewater sludge to a level that meets or exceeds USEPA Process to Further Reduce Pathogens standards, wherein lime or kiln dust and/or other alkaline materials are mixed with wastewater sludge in sufficient quantity to raise the pH of the mixture to 12 and above for a predetermined time and drying the resulting mixture.

8 Claims, 10 Drawing Sheets

FIG. 7

METHOD FOR TREATING WASTEWATER SLUDGE

This invention relates to a method of treating wastewater sludge designed to decontaminate the sludge so that it can be safely applied as fertilizer to agricultural lands.

BACKGROUND OF THE INVENTION

Romans used lime to disinfect and deodorize human waste. The use has continued throughout the development of civilization. However, prior to this invention, the use of lime for wastewater sludge treatment has been severely limited by governmental regulations including the United States Environmental Protection Agency (EPA).

The EPA has promulgated rules governing the type of processes that can be used to treat wastewater sludge.

Under 40 CFR 257, a Process to Further Reduce Pathogens (PFRP) (See p. 5,6) must be used where sewage sludge or septic tank pumpings are to be applied to a land surface or are incorporated into the soil, and crops for direct human consumption are to be grown on such land within eighteen (18) months subsequent to application or incorporation.

A Process to Significantly Reduce Pathogens (PSRP) (See p. 5) must be used where sewage sludge or septic tank pumpings are to be applied to a land surface or incorporated into the soil and the public will have access to such land within twelve (12) months subsequent to application or incorporation, or grazing animals, whose products are consumed by humans, will have access to such land within one (1) month subsequent to application or incorporation.

Appendix II of 40 CFR 257 classifies the following as PSRP and PFRP processes:

A. Processes to Significantly Reduce Pathogens

Aerobic digestion: The process is conducted by agitating sludge with air or oxygen to maintain aerobic conditions at residence times ranging from 60 days at 15° C. to 40 days at 20° C., with a volatile solids reduction of at least 38 percent.

Air Drying: Liquid sludge is allowed to drain and/or dry on under-drained sand beds, or paved or unpaved basins in which the sludge is at a depth of nine inches. A minimum of three months is needed, two months of which temperatures average on a daily basis above 0° C.

Anaerobic digestion: The process is conducted in the absence of air at residence times ranging from 60 days at 20° C. to 15 days at 35° to 55° C., with a volatile solids reduction of at least 38 percent.

Composting: Using the within-vessel, static aerated pile or windrow composting methods, the solid waste is maintained at minimum operating conditions of 40° C. for 55 days. For four hours during this period the temperature exceeds 55° C.

Lime Stabilization: Sufficient lime is added to produce a pH of 12 after 2 hours of contact.

Other methods: Other methods or operating conditions may be acceptable if pathogens and vector attraction of the waste (volatile solids) are reduced to an extent equivalent to the reduction achieved by any of the above methods.

B. Processes to Further Reduce Pathogens

Composting: Using the within-vessel composting method, the solid waste is maintained at operating conditions of 55° C. or greater for three days. Using the static aerated pile composting method, the solid waste is maintained at operating conditions of 55° C. or greater for three days. Using the windrow composting method, the solid waste attains a temperature of 5° C. or greater for at least 15 days during the composting period. Also, during the high temperature period, there will be a minimum of five turnings of the windrow.

Heat drying: Dewatered sludge cake is dried by direct or indirect contact with hot gases, and moisture content is reduced to 10 percent or lower. Sludge particles reach temperatures well in excess of 80° C., or the wet bulb temperature of the gas stream in contact with the sludge at the point where it leaves the dryer is in excess of 80° C.

Heat treatment: Liquid sludge is heated to temperatures or 180° C. for 30 minutes.

Thermophilic Aerobic Digestion: Liquid sludge is agitated with air or oxygen to maintain aerobic conditions at residence times of 10 days at 55-60° C., with a volatile solids reduction of at least 38 percent.

Other methods: Other methods of operating conditions may be acceptable if pathogens and vector attraction of the waste (volatile solids) are reduced to an extent equivalent to the reduction achieved by any of the above methods.

Any of the processes listed below, if added to the processes described in Section A above, further reduce pathogens. Because the processes listed below, on their own, do not reduce the attraction of disease vectors, they are only add-on in nature.

Beta ray irradiation: Sludge is irradiated with beta rays from an accelerator at dosages or at least 1.0 megarad at room temperature (ca. 20° C.).

Gamma ray irradiation: Sludge is irradiated with gamma rays from certain isotopes, such as $^{60}$Cobalt and $^{137}$Cesium, at dosages of at least 1.0 megarad at room temperature (ca. 20° C.).

Pasteurization: Sludge is maintained for at least 30 minutes at a minimum temperature of 70° C.

Other methods: Other methods of operating conditions may be acceptable if pathogens are reduced to an extent equivalent to the reduction achieved by any of the above add-on method.

Prior to this invention, many concerns have been raised about the long term disinfection and stabilization capability of lime treatment. Parrel et al, in "Lime Stabilization of Primary Sludges", Journal of Water Pollution Control Fed 46, 113 Jan. 1974 published by USEPA, states: "Lime stabilization does not make the sludges chemically stable. The pH eventually falls and surviving bacteria may return if conditions are favorable... higher organisms such as Ascaris survive short term exposure to pH of 11.5 and possibly long term exposure."

In January 1979, the EPA published a Wastewater Sludge Manual (EPA 625/1-79-001) titled "Process Design Manual for Sludge Treatment and Disposal" which states:

"Lime stabilizations a very simple process. Its principal advantages over other stabilization processes are low cost and simplicity of operation... lime addition does not make sludges chemically stable; if pH drops below 11.0, biological decomposition will resume producing noxious odors. Second, the quantity of sludge for disposal is not reduced as it is by biological stabilization methods. On the contrary, the mass of dry sludge is increased by the lime added and by the chemical precipitates that derive from the addition. Thus because of the increased volume, the costs of transport and ultimate disposal are often greater for lime stabilized sludges than for sludge stabilized by other method...quantitative observation under a microscope has shown substantial survival of higher organisms, such as hook worms, amoebic systs and Ascaris ova after contact time of 24 hours at high pH."

Reimers, Englande et al (EPA 600/2-81-166) reported that:

"Application of like to primary aerobic digested and anaerobic digested sludge was found to be effective with greater than 80% reduction of Ascaris viability in 5 days following aerobic digestion at a lime dosage of about 1000 mg/gram of sludge solids (one part lime to one part sludge solids)... In the case of the 35° C. aerobically-digested sludge, there was no apparent effect of lime on the viability of Ascaris eggs at dosages up to 3000 mg of lime per gram of dry sludge solids under anaerobic conditions, in the period of 20 days. However, under aerobic conditions, a 98% reduction of viable Ascaris eggs was observed within one hour at dosages greater than 1000 mg of lime per gram of dry sludge solid, but only 77% reduction of the viable eggs was observed at a dosage of 100 mg lime per gram of dry sludge solids after 20 days. The explanation of these differentials is not apparent."

In July 1984, the Sandia National Laboratories published a report titled "Pathogens in Sludge Occurrence, Inactivation and Potential for Regrowth" which states:

"To summarize the effects of lime on sludge pathogens viruses are destroyed by high pH values, although it has not been shown that viruses within sludge itself are inactivated; parasite ova are resistant to high pH, and most will probably survive lime treatment; bacteria are rapidly inactivated at pH 12 but, because of pH decreases at levels suitable for bacteria growth, their numbers increase with time."

In October 1984, the EPA published a report (EPA 625/10-84-003) titled "Use and Disposal of Municipal Wastewater Sludge" which was the basis for future regulations. Section 3 of the report states:

"If crops for direct human consumption are grown within 18 months of sludge application, sludge must be treated with a PFRP. These processes destroy pathogenic bacteria, viruses and protozoa as well as parasites in most cases by exposing the sludge to elevated temperatures over a period of time."

On November 6, 1985 the EPA issued a memorandum regarding application of 40 CFR 257 regulations to pathogen reduction preceding land application of sewage sludge or septic tank pumpings. One of the purposes of issuing the memorandum was to outline procedures to enable enforcement agents to determine whether processes other than those listed in the regulation (40 CFR 257) qualify as a PFRP process. To qualify a process as a PSRP, one must demonstrate that the process reduces animal viruses by one log and pathogenic bacterial densities by at least two logs and must reduce the vector attractiveness such that vectors, like flies or rats, are not attracted to the sludge. To qualify a new process as PFRP, one must demonstrate reduction of pathogenic bacteria, animal viruses, and parasites "below detectable limits" of one (1) plaque forming unit (PFU) per 100 ml of sludge for animal viruses; three (3) colony forming units (CFU) per 100 ml of sludge for pathogenic bacteria (*Salmonella sp.*); and one (1) viable egg per 100 ml of sludge for parasites (*Ascaris sp.*). Vector attractiveness must also be reduced for PFRP.

If only PSRP disinfective is utilized, land application for fertilization purposes is controlled by EPA restrictions (it cannot be used on root crop: "40 CFR 257"). If the process achieves PFRP criteria these restrictions are eliminated ("40 CFR 257").

In my U.S. Pat. No. 4,554,002, it was shown that kiln dust could be used to reduce pathogens and dry wastewater sludge prior to land application.

Roediger, U.S. Pat. No. 4,270,279, describes a method of drying and sterilizing sewage sludge wherein sheet-like sewage sludge is broken up into ball-like sludge particles and dusting the outer surface only with quicklime. This technology utilizes exothermic heat generated from the reaction of adding $H_2O$ to quick lime to sterilize the sludge. This heat sterilization is typical to the traditional aforementioned PFRP processes. To this date, the EPA has not approved a petition for approval of this technology as a PSRP process. Moreover, there are problems with this method. If this method actually sterilizes the sludge, it would kill all life forms contained in the sludge, whether they were pathogenic or beneficial non-pathogenic microorganisms. In contrast, the present invention decontaminates sludge, killing pathogens to a level below PFRP standards but does not eliminate all nonpathogenic microorganisms from the sludge.

None of the above references suggest that lime or kiln dust, in combination with a natural drying process, could be used to produce the pathogenic reducton in wastewater sludge equivalent to PFRP processes, and thus provide an inexpensive method of treating wastewater sludge such that it can be applied directly to land as a fertilizer to grow crops for direct human consumption.

SUMMARY OF THE INVENTION

In accordance with the invention, lime, cement kiln dust or lime kiln dust or mixtures thereof and/or other alkaline materials are mixed with wastewater sludge in sufficient quantity to raise the pH to 12 and above for at least two hours and the resulting mixture is dried by an aeration process. The process produces a product wherein the pathogen viability has been reduced to a level that meets or exceeds USEPA criteria for PFRP processes.

BRIEF DESCRIPTION OF THE DRAWINGS

FIG. 7 is a bar chart of the log number of enterovirus per weight of sludge versus days of treatment.

DESCRIPTION

Figure 1:
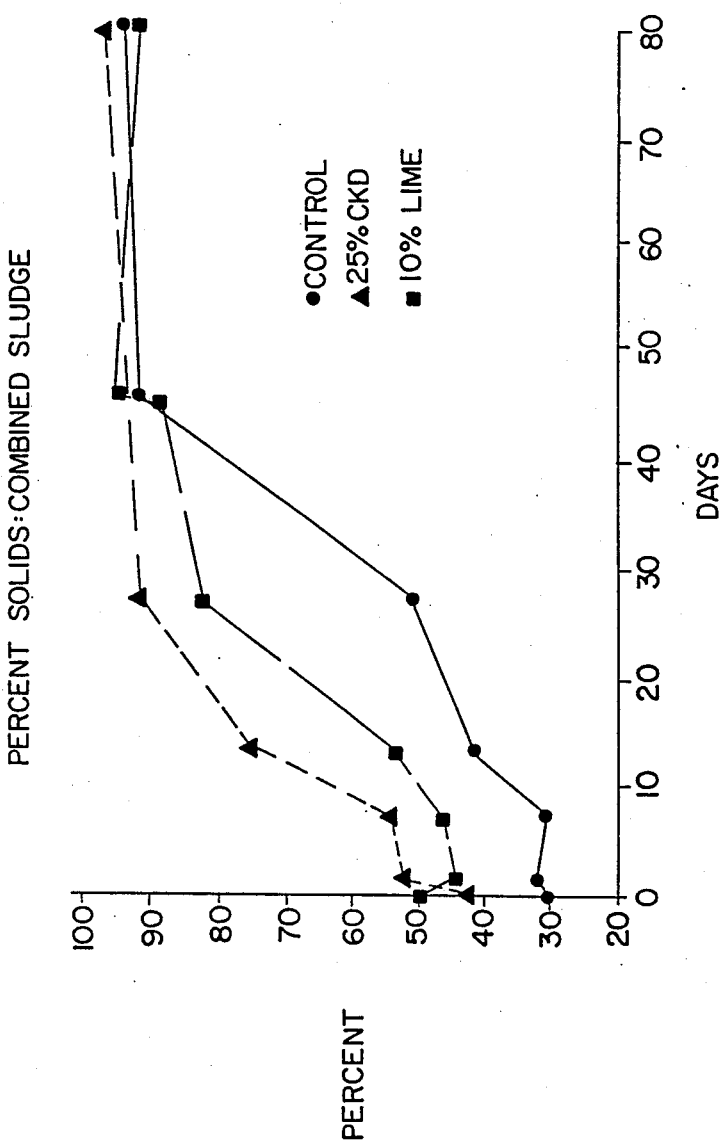
FIG. 1 are curves of the percent solids of sludge versus days of treatment.

Basically, the process of this invention comprises mechanically dewatering the sludge; chemical stabilizing of the wastewater sludge with quantities of lime, cement kiln dust or lime kiln dust or mixtures thereof sufficient to maintain a pH of 12 and above for at least two hours and preferably for days; and then drying the sludge by an aeration process such as a Brown Bear aerating device. To achieve PFRP pathogen reduction criteria, the treated sludge is aerated such that the sludge is at least eighty percent (80%) by weight solids and preferably ninety percent (90%) by weight solids. The product is allowed to air cure for about 10 days after desired solids content is achieved. The drying and curing of the mixture may also be accomplished by a windrow method, turn-over method, or other forced air methods. The curing time or aeration time is dependent on the type of storage facility (cover, enclosed, or open), aeration procedure, mix design, physical and chemical properties of the admixtures, quality of the mixing facilities, percent solids of dewatering cake, and type of sludge. The chemical stabilizing admixture can be added after mechanical dewatering, if desired. Lime, cement kiln dust and lime kiln dust are excellent flocculents and thus can be useful in conditioning prior to mechanical dewatering with most equipment.

The range of lime, cement kiln dust or lime kiln dust mixed with the sludge is about ten percent (10%) by weight to 200% by weight of the dry sludge depending on the variables listed above.

The addition of high reactant-heat generating materials or heating the sludge and materials may be used to reduce the total amount of admixture required and/or reduce the curing time required. Addition of anhydrous ammonia and either phosphoric acid or sulphuric acid to chemical stabilized sludge, having a pH of 12 and above, produces sufficient heat to help reduce pathogens to a level equivalent to PFRP processes and at the same time increases the nutritional value of the sludge while reducing curing time and natural drying requirements. In addition to chemical generated heat, mechanical or electrical heat may be applied to dry and cure the mixture.

The solid waste generated by cement manufacture is primarily kiln dust. This dust contains a mixture of raw kiln feed, partly calcined material, finely divided cement clinker and alkaline and alkali carbonates and sulfates (usually sulfates). There is economic value in returning the dust to the kiln, but when the alkali content of the returned dust is too high for the product clinker to meet specifications, the dust must be discarded. Up to about 15% of the raw materials processed may be collected as dust and of this about half may be low enough in alkalis to be returned to the kiln. The rest usually stockpiled as a waste material which usually is discarded and may be a nuisance and possibly a hazard.

Typically, the major oxide found in a cement kiln dust are: $SiO_2$, $Al_2O_3$, $Fe_2O_3$, $CaO$, $MgO$, $SO_3$, $Na_2O$ and $K_2O$.

The solid waste generated by lime manufacture is primarily lime stack dust. This dust contains a mixture of raw kiln feed, partly calcined material, and finely divided material. There is no value in returning the dust to the kiln, as it is too fine and passes directly through to the precipitator again. Up to about 15% of the raw materials processed may be collected as dust. It is usually stockpiled as a waste material which usually is discarded and may be a nuisance and possibly a hazard.

Typically, the major oxides found in lime stack dust are: $CaO$, $MgO$, $SO_3$, $CO_2$ and Availabe Free Lime.

A combination of materials may be used to provide the most economical system such as using lime, cement kiln dust or lime kiln dust or mixtures thereof to achieve chemical stabilization, and adding bulking material such as slag fines, fly ash, gypsum, fluidized bed residue, dry sulphur scrubber residue, calcium sulphate fines, and the like, to assist in dewatering. Lime, cement kiln dust or lime kiln dust alone cannot achieve the desired results of reducing pathogens to PFRP levels, but when used in combination with a drying process, the decontamination can achieve PFRP levels.

The process will drastically reduce the odor of the sludge, even though the pH may drop below 9 during the curing period and the use of admixtures as bulking agents reduces the volume of the sludge for disposal or utilization.

In a test, the use of cement kiln dust (CKD) and lime to stabilize and disinfect sludge from the Toledo municipal wastewater treatment plant was studied.

Specifically, tests were conducted to determine whether the processes embodying this invention met requirements to be classified as a Process to Significantly Reduce Pathogens (PSRP) and a Process to Further Reduce Pathogens (PFRP). As indicated above, for PSRP classification, the fecal and total coliform bacterial counts must be reduced by two logs and the animal virus count must be reduced by one log. For PFRP classification, animal viruses must be less than one (1) plaque forming unit (PFU) per 100 ml of sludge; pathogenic bacteria (Salmonella) must be less than three (3) colony forming units (CFU) per 100 ml of sludge; and parasites (helmonth eggs - Ascaris) must be less than one (1) viable egg per 100 ml of sludge, wherein 100 ml of sludge is equivalent to about five (5) gms of dry solids. (As indicated in EPA Memorandum of November 6, 1985).

FIG. 1, comprises a curve of the percent solids of combined sludge versus days of treatment, without any added materials, with twenty-five percent (25%) by weight cement kiln dust (CKD), and with ten percent (10%) by weight lime.

As illustrated by FIG. 1, the addition of either ten percent (10%) by weight of lime or twenty-five percent (25%) by weight of cement kiln dust (CKD) enhanced the drying rate of sludges, particularly in the first four weeks of treatment. Combined sludge is a mixture of primary sludge and secondary (waste activated) sludge.

Figure 2:
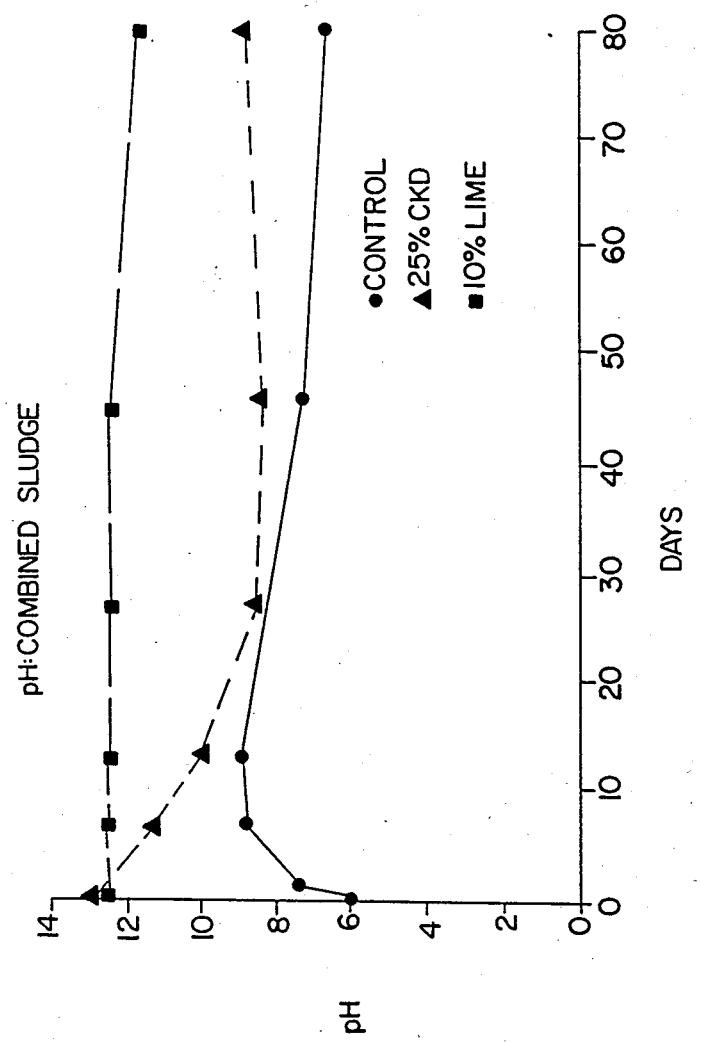
FIG. 2 are curves of the pH of sludge versus days of treatment.

FIG. 2, comprises a curve of pH of combined sludge versus days of treatment, without any added materials, with twenty-five percent (25%) by weight cement kiln dust (CKD), and with ten percent (10%) by weight lime.

FIG. 2, shows that the pH of ten percent (10%) by weight lime treated sludge did not decline appreciably during the study and that twenty-five percent (25%) by weight cement kiln dust treated sludge maintained a pH level of 12.4 for one (1) day before slowly declining and reading control levels in about four weeks.

Figure 3:
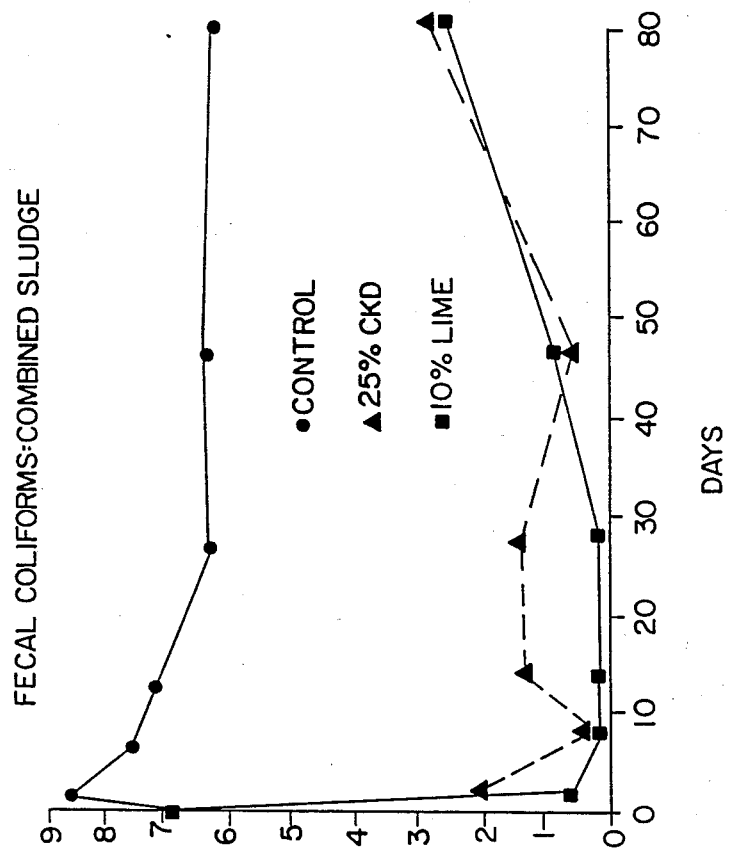
FIG. 3 are curves of the log number of fecal coliform per weight of sludge versus days of treatment.

FIG. 3, comprises a curve of the log number of fecal coliform per weight of combined sludge versus days of treatment, without any added materials, with twenty-five percent (25%) by weight cement kiln dust (CKD), and ten percent (10%) by weight lime.

FIG. 3, shows that fecal coliforms, one of the most common types of indicator bacteria used for water quality assays, were unaffected in untreated sludge regardless of the amount of drying. However, the sludge treated with twenty-five percent (25%) by weight cement kiln dust showed a rapid five (5) log reduction in coliforms in one (1) day and dropped even further in one week to one (1) bacterium per five (5) gms dry weight of sludge. The sludge treated with ten percent (10%) be weight lime treated sludge experienced a six (6) log reduction in coliforms in the first day. Some regrowth was found in both lime and cement kiln dust treated sludge with the final population measured at 500 bacteria/5 gm dry at sludge.

Figure 4:
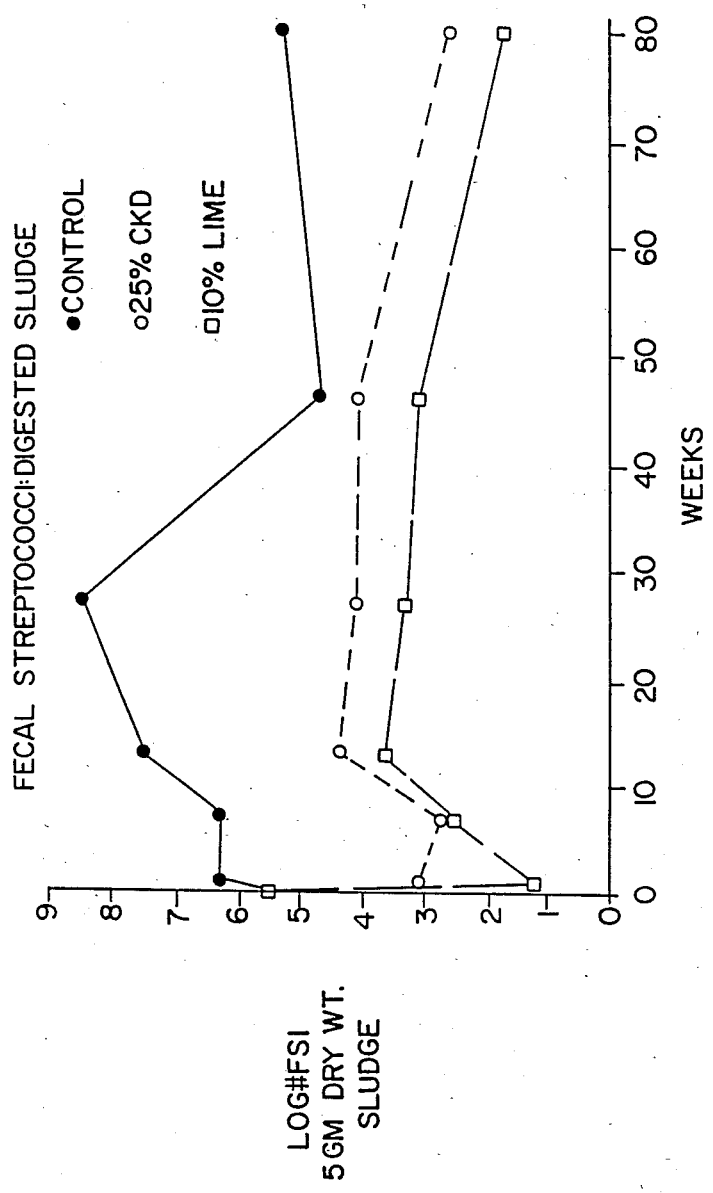
FIG. 4 are curves of the log number of fecal streptococci per weight of sludge versus days of treatment.

FIG. 4, comprises a curve of the log number of fecal streptococci per weight of digested sludge versus days of treatment, without any added materials, with twenty-five percent (25%) by weight cement kiln dust (CKD), and ten percent (10%) by weight lime.

FIG. 4 illustrates that the fecal streptococci decreased in both the lime and cement kiln dust treated samples by over two logs but did not decline any further over the course of the study. The significance of this observation is that the cement kiln dust and lime did not possess an inherent toxicity sufficient to kill all microorganisms and that the killing process selected out only certain microbial populations such as Salmonella.

Figure 5:
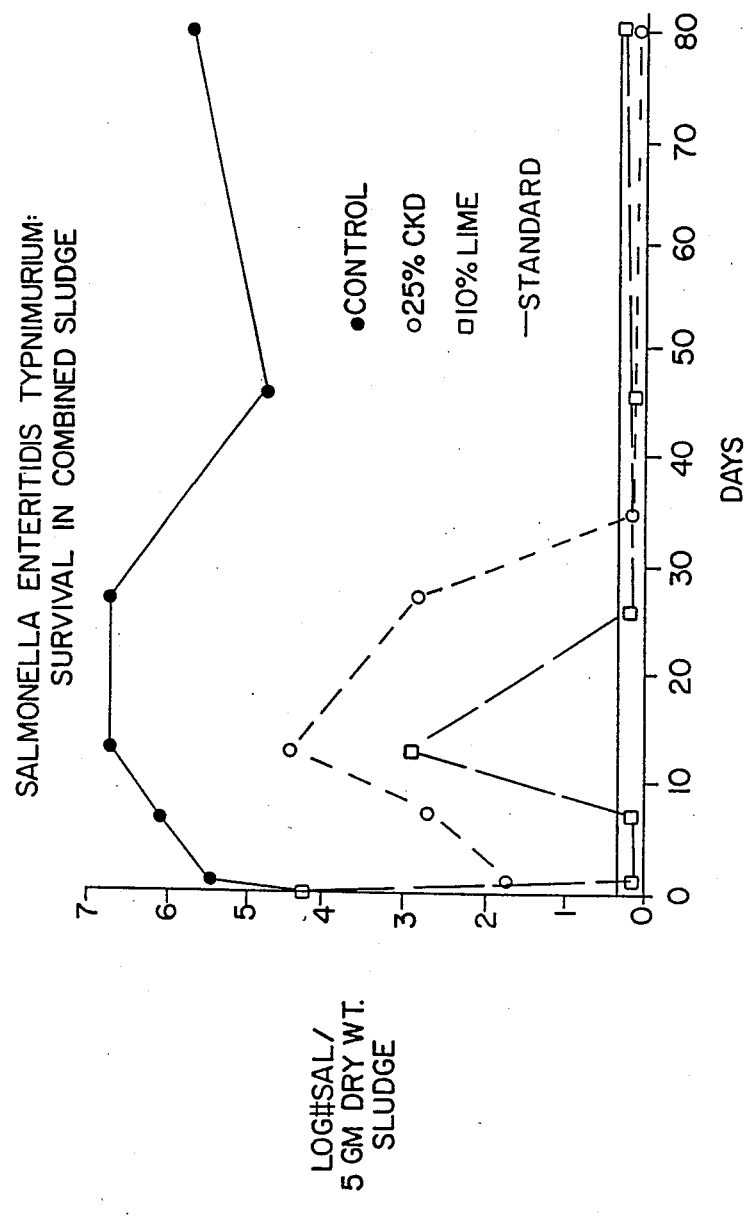
FIG. 5 are curves of the log number of *Salmonella enteritidis typhimurium* per weight of combined sludge versus days of treatment.

FIG. 5, comprises a curve of the log number of *Salmonella enteritidis typhimurium* per weight of combined sludge verses days of treatment, without any added materials, with twenty-five percent (25%) by weight cement kiln dust, and ten percent (10%) by weight lime.

Figure 6:
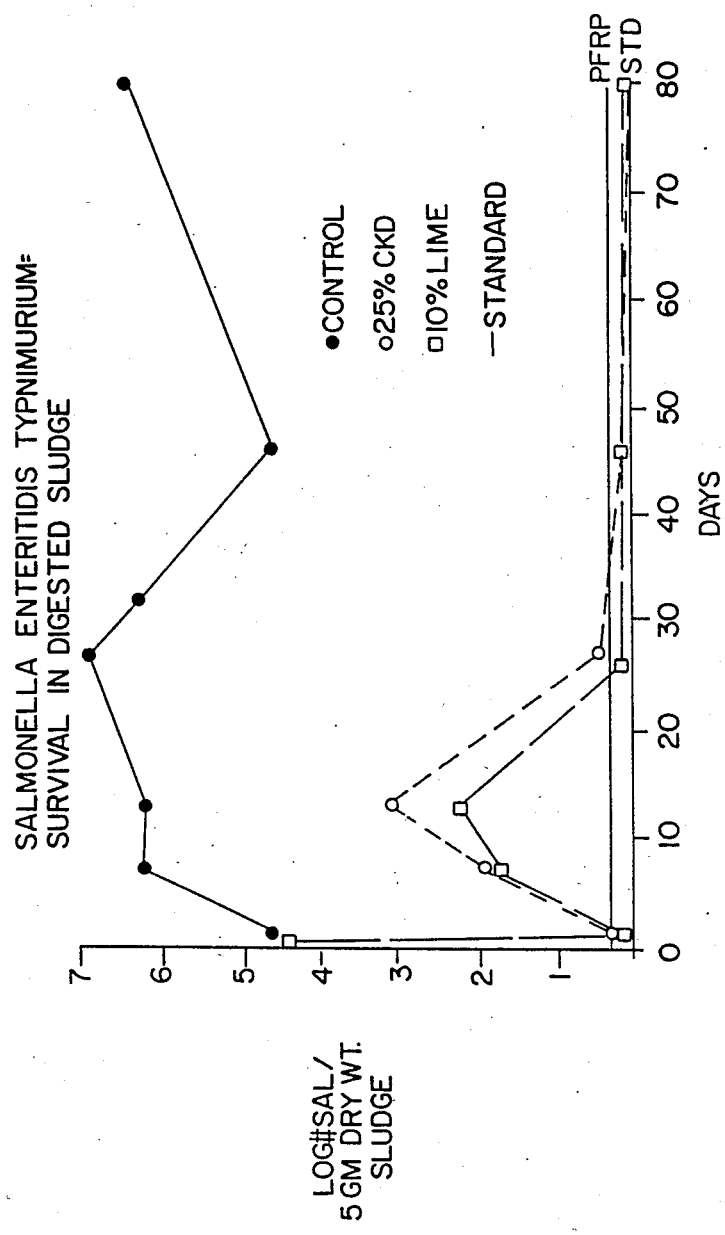
FIG. 6 are curves of the log number of *Salmonella enteritidis typhimurium* per weight of digested sludge versus days of treatment.

FIG. 6, comprises a curve of the log number of *Salmonella enteritidis typhimurium* per weight of digested sludge verses days of treatment, without any added materials, with twenty-five percent (25%) by weight cement kiln dust (CKD), and with ten percent (10%) by weight lime.

The principal bacterial indicator used by EPA in the setting of PFRP standards for agricultural use of sludge is the pathogen *Salmonella enteritidis typhimurium*. FIGS. 5 and 6 show that following an initial three to four (3-4) log decrease in one day, the Salmonella in all samples regrew to over 1000 Salmonella/5 gm dry weight sludge. Only after a combination of drying and pH exposure for over four (4) weeks did the Salmonella die off to levels associated with PFRP processes. The untreated or controlled Salmonella samples did not decrease over the eighty (80) days.

Figure 7:
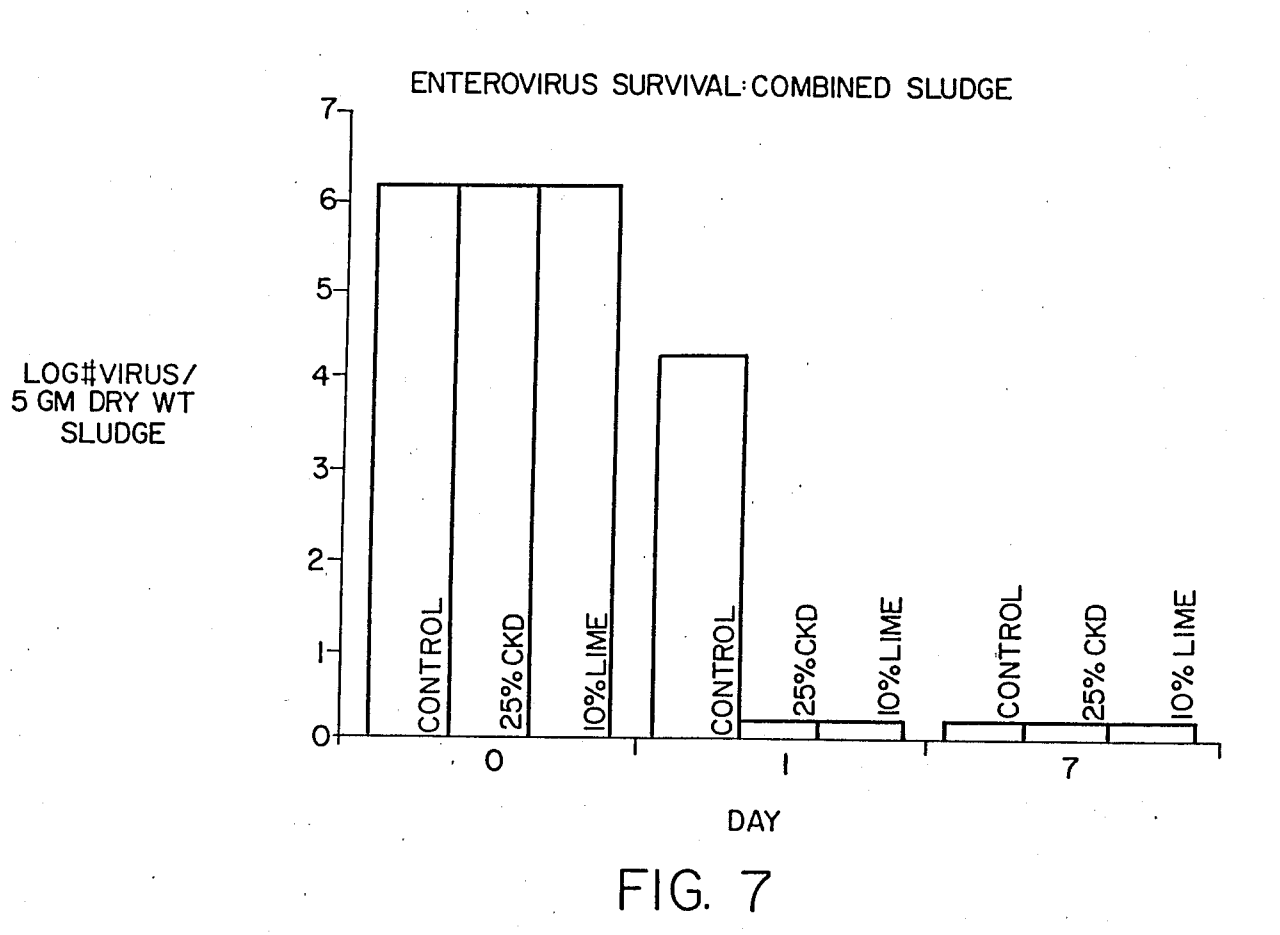

FIG. 7, comprises a bar chart of the log number of enterovirus per weight of combined sludge verses days of treatment, without any added materials, with twenty-five percent (25%) by weight cement kiln dust (CKD), and with ten percent (10%) by weight lime.

The enterovirus, Poliovirus type I, was measured for survival by assaying for viable virus on tissue culture lawns of Vero cells. The virus viability was decreased by cement kiln dust and lime treatment to levels associated with PFRP processes in one day, i.e. less than one viable virus per five (5) gm dry weight sludge as illustrated in FIG. 7. Virus levels in the untreated sludge sample decreased almost two (2) logs in one day and the entire population died in one (1) week.

Figure 8:
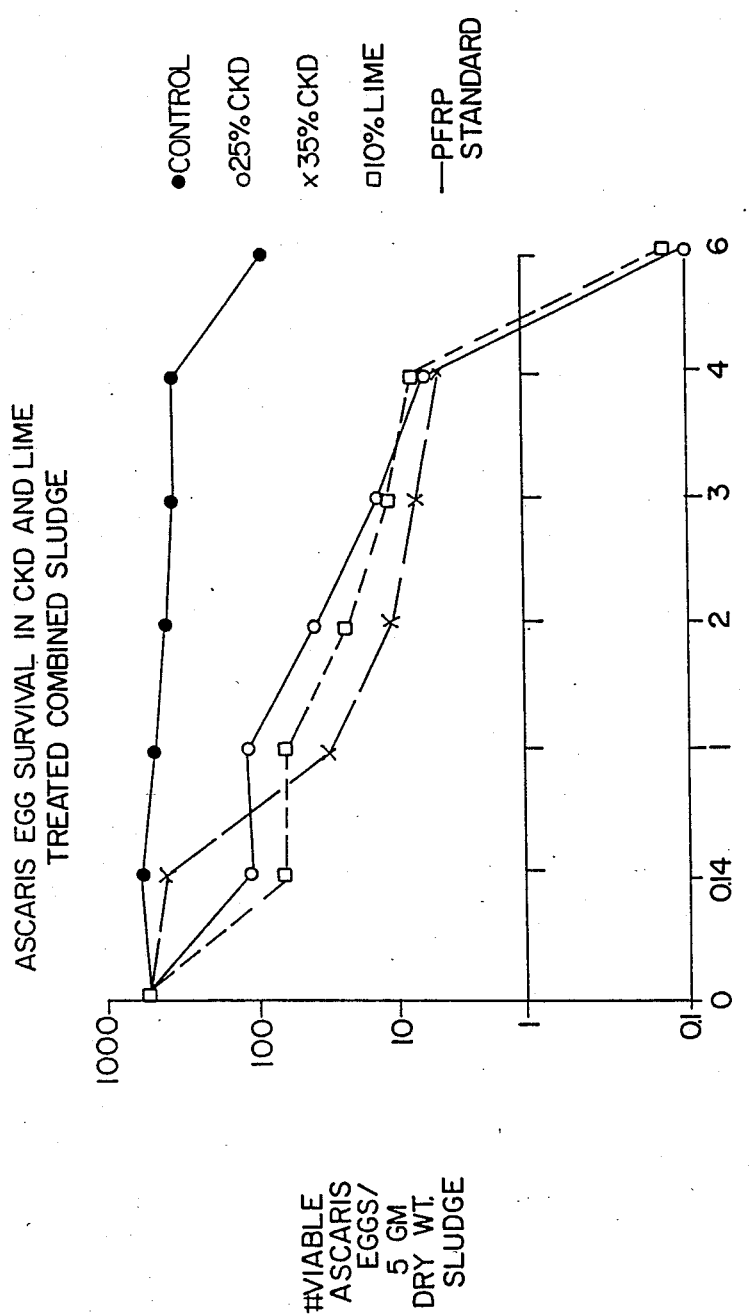
FIG. 8 are curves of the number of viable Ascaris eggs per weight of combined sludge versus weeks of treatment.

FIG. 8, comprises a curve of the number of viable Ascaris eggs per weight of combined sludge versus weeks of treatment, without any added materials, with twenty-five percent (25%) and thirty-five percent (35%) by weight cement kiln dust (CKD), and with ten percent (10%) by weight lime.

Figure 9:
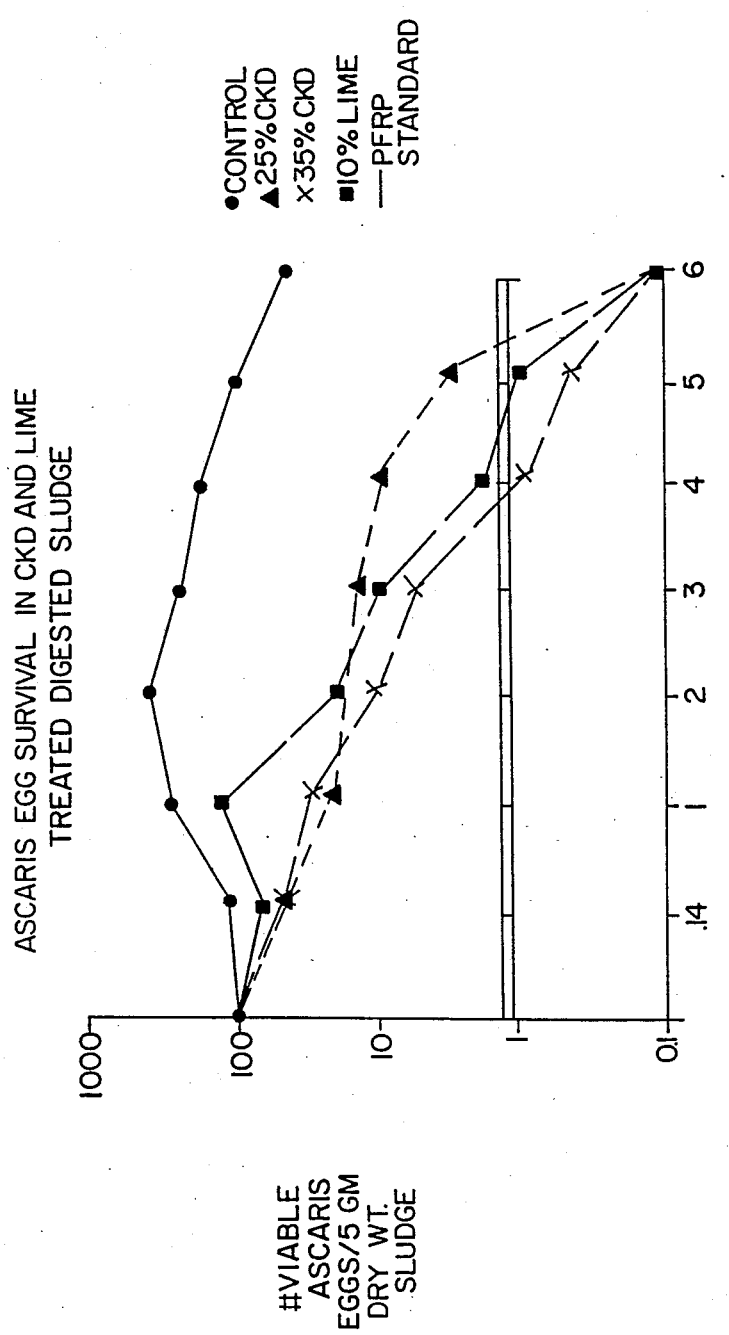
FIG. 9 are curves of the umber of digested sludge versus weeks of treatment.

FIG. 9, comprises a curve of the number of viable Ascaris eggs per weight of digested sludge versus weeks of treatment, without any added materials, with twenty-five percent (25%) and thirty-five percent (35%) by weight cement kiln dust (CKD), and with ten percent (10%) by weight lime.

In other treatment processes for the stabilization of wastewater sludge the viability or the helminth ova has been the major difficulty encountered and certainly the most stringent of the EPA parameters to meet. The initial level of Ascaris eggs added to the sludge was 16000/5 gm dry weight sludge. Recovery following the procedure for measuring viability of these eggs ranged from about two percent (2%) in the digested sludge to about six percent (6%) in the combined sludge. The viability of these recovered eggs is shown in FIGS. 8 and 9 for combined and digested sludges respectively. The viability of these eggs decreased to PFRP required levels of one (1) viable eggs/5gm dry weight sludge in the twenty-five percent (25%) and thirty-five percent (35%) by weight cement kiln dust and in the ten percent (10%) by weight lime treated combined and digested sludges only after six (6) weeks of incubation.

The reduction of pathogens that occurred in the sludge as a result of cement kiln dust or lime addition appears to be due to the samples initially achieving a pH of 11.5 followed by a synergistic interaction of elevated pH and drying. This proposition is supported by the following facts: a) the samples without high pH but with significant drying did not experience a significant decline in microorganisms; b) the samples such as the twenty-five percent (25%) by weight cement kiln dust treated combined sludge exhibited an initial high pH but a subsequent lower pH plateau and showed a killing of the Ascaris eggs continued at nearly logarithmic rates; c) the longer the pH remained elevated above 9.5, as in the twenty-five percent (25%) by weight and thirty-five percent (35%) by weight cement kiln dust samples, the better the killing results with the Ascaris eggs; d) as shown in the curve for the five percent (5%) by weight lime samples, higher pH by itself, without elevated drying, showed a delay in the killing of the Ascaris eggs.

Figure 10:
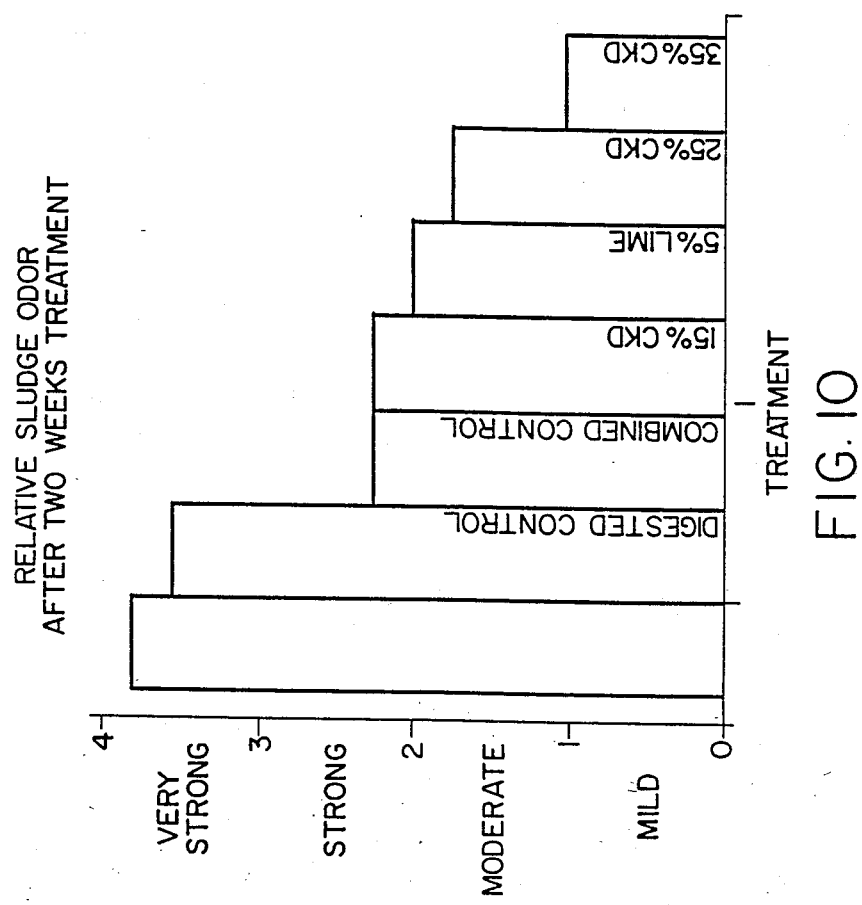
FIG. 10 is a bar chart of the relative sludge odor after two weeks of treatment.

FIG. 10, comprises a bar chart of the relative sludge odor after two weeks for digested and combined sludge, without any added materials, with fifteen percent (15%), twenty-five percent (25%), and thirty-five percent (35%) by weight cement kiln dust, and with five percent (5%) and ten percent (10%) by weight lime.

As illustrated by FIG. 10, the addition of cement kiln dust or lime did have an effect on the odor of the sludge. However, while all cement kiln dust and lime treatments improved the odor of the sludge, only the thirty-five percent (35%) by weight cement kiln dust treated sludge reduced the odor to a level that could be considered tolerable in a closed room.

It was also determined that the addition of cement kiln dust or lime to sludge had an effect on the material handling aspect of such sludge. The thirty-five percent (35%) by weight cement kiln dust treated sludge had an individual particle size averaging about two to five (2-5) mm in diameter and thus rendered the treated sludge easy to handle. In contrast, the lime treated and the fifteen percent (15%) and twenty-five percent (25%) by weight cement kiln dust treated samples all contained very large lumps averaging about three to eight (3-8) cm in diameter and rendered the treated sludge less easy to handle.

The following conclusions were reached regarding lime and kiln dust treated sludge processes:

1. Sludge treated with cement kiln dust or lime in all cases tested met PSRP classification requirements.

2. Cement kiln dust treated sludge enhanced the drying rate of sludges particularly in the first four (4) weeks of treatment.

3. Cement kiln dust treated sludge loses its pH value more rapidly than lime treated sludge.

4. Bacterial pathogens such as Salmonella are controlled to PFRP levels by five (5) weeks when such sludges are treated with twenty-five percent (25%) and thirty-five percent (35%) by weight cement kiln dust or ten percent (10%) by weight lime.

5. Enterovirus levels were controlled to PFRP levels within one day by both cement kiln dust and lime treated sludges.

6. Ascaris egg survival was reduced by more than three (3) logs by higher dosage treatments within four (4) weeks. The twenty-five percent (25%) CKD, thirty-five percent (35%) CKD and ten percent (10%) by weight lime treated sludges have been shown to reach PFRP (1 viable egg/5 gm dry wt sludge) levels by day forty-six (46). The sample containing fifteen percent (15%) CKD in the combined sludge did not reach PFRP standards, while the sample with fifteen percent (15%) CKD in digested sludge did.

7. Both CKD and lime treatments reduce sludge odor. Only thirty-five percent (35%) CKD by weight treatment reduced odor to mild levels.

8. Drying was not sufficient by itself to kill microorganisms in sludge.

9. Regrowth of pathogens (Salmonella) was effectively prevented over the eighty (80) days of the study.

10. All EPA PFRP standards were reached after six (6) weeks of incubation of the twenty-five percent (25%) CKD, the thirty-five percent (35%) CKD and the ten percent (10%) lime by weight treated sludges.

With regard to the three PFRP standards the following results were achieved by six plus (6+) weeks (46 days):

| SLUDGE | TREAT-MENT | Salmonella | STANDARD Virus | Ascaris | All |
|---|---|---|---|---|---|
| COMBINED | Control | No | No | No | No |
| | 15% CKD | No | — | No | No |
| | 25% CKD | Yes (35) | Yes (1) | Yes (46) | Yes |
| | 35% CKD | Yes (27) | — | Yes (46) | Yes |
| | 5% Lime | Yes (46) | — | Yes (46) | ? |
| | 10% Lime | Yes (27) | Yes (1) | Yes (46) | Yes |
| DIGESTED | Control | No | No | No | No |
| | 15% CKD | Yes (46) | — | Yes (46) | ? |
| | 25% CKD | Yes (46) | — | Yes (46) | Yes* |
| | 35% CKD | Yes (27) | — | Yes (46) | Yes* |
| | 5% Lime | No | — | Yes (46) | No |
| | 10% Lime | Yes (27) | — | Yes (46) | Yes* |

Key:
No = PFRP not achieved
Yes = PFRP achieved
(3) = day that achievement was detected
? = results not completed
*conclusion based upon data with combined sludge Tests were conducted on the following 12 treatment groups:

| Combined | Digested |
|---|---|
| 1. Untreated | 7. Untreated |
| 2. 15% CKD | 8. 15% CKD |
| 3. 25% CKD | 9. 25% CKD |
| 4. 35% CKD | 10. 35% CKD |
| 5. 5% Lime | 11. 5% Lime |
| 6. 10% Lime | 12. 10% Lime |

Each of these treatment groups (5000g sludge plus treatment) was contained in a 10 liter plastic tub. These were kept dry at 68F and were mixed twice weekly to facilitate drying. Samples were removed at 0, 1, 7, 13, 27, 46 and 80 days and processed to determine pathogen and microorganism survival. The parameters that were determined at each sampling are listed as follows:

percent solids
pH
volume
fecal coliforms
fecal *streptococci*
*Salmonella enteritidis typhimurium*
*Ascaris suum* eggs
Human enteric virus (Polio Type I-vaccine strain)

The data from which the above referenced results and FIGS. 1-10 were compiled are summarized in the following tables.

TABLE I

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | combined CONTROL | 6.8 | 92.7 | 76 | $1.7 \times 10^6$ | $6.5 \times 10^5$ | $7.5 \times 10^5$ | — | — |
| 2 | 15% CKD/COMB | 8.3 | 94.8 | — | $1.7 \times 10^5$ | $3.4 \times 10^7$ | 12.5 | — | — |
| 3 | 25% CKD/COMB | 8.9 | 95.2 | 57.2 | $5 \times 10^2$ | $3.4 \times 10^5$ | 0.4 | — | — |
| 4 | 35% CKD/COMB | 9.3 | 93.3 | — | $5 \times 10^2$ | $2.8 \times 10^2$ | 0.4 | — | — |
| 5 | 5% LIME/COMB | 8.4 | 91.2 | — | $5.5 \times 10^2$ | $3.5 \times 10^3$ | 2.9 | — | — |
| 6 | 10% LIME/COMB | 11.7 | 92.2 | 74.0 | $5 \times 10^2$ | $6.5 \times 10^0$ | 2.9 | — | — |
| 7 | DIGEST CONTROL | 6.3 | 92.4 | 74.0 | $4.7 \times 10^6$ | $2.4 \times 10^5$ | $3.5 \times 10^6$ | — | — |
| 8 | 15% CKD/DIG | 8.4 | 93.9 | | $6.5 \times 10^3$ | $1.1 \times 10^5$ | 0.4 | — | — |
| 9 | 25% CKD/DIG | 9.2 | 93.6 | 56.0 | $5 \times 10^2$ | $6.5 \times 10^2$ | 0.4 | — | — |
| 10 | 35% CKD/DIG | 9.6 | 92.4 | | $5 \times 10^2$ | $2.4 \times 10^1$ | 0.4 | — | — |
| 11 | 5% LIME/DIG | 8.6 | 92.4 | | $2.8 \times 10^2$ | $4.8 \times 10^1$ | 0.4 | — | — |

TABLE I-continued

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 12 | 10% LIME/DIG | 12.0 | 92.5 | 72.0 | 4.9 | $6.5 \times 10^1$ | 0.4 | — | — |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combinded sludge; CKD/COMB = Combined sludge treated with cement kiln dust; LIME/COMB = combined sludge treated with Lime; DIGEST CONTROL = Untreated digested sludge; CKD/DIG = digested sludge treated with cement kiln dust, LIME/DIG = Digested sludge treated with lime. - Elapsed Time 80 days

TABLE II

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | 7.3 | 92.3 | 76.0 | $1.9 \times 10^6$ | $2.8 \times 10^8$ | $6.5 \times 10^4$ | — | 80.8 |
| 2 | 15% CKD/COMB | 8.4 | 94.7 | | $1.0 \times 10^4$ | $1.5 \times 10^7$ | $4.9 \times 10^1$ | — | 2.8 |
| 3 | 25% CKD/COMB | 8.4 | 94.2 | 68.0 | $4.9 \times 10^0$ | $2.6 \times 10^4$ | .4 | — | 0 |
| 4 | 35% CKD/COMB | 10.1 | 91.9 | | 0.4 | $6.5 \times 10^1$ | .4 | — | 0 |
| 5 | 5% LIME/COMB | 8.1 | 93.1 | | $3.5 \times 10^2$ | $6.5 \times 10^4$ | .4 | — | 0 |
| 6 | 10% LIME/COMB | 12.5 | 89.7 | 82.0 | 6.7 | $1.1 \times 10^3$ | .4 | — | 0 |
| 7 | DIGESTED CONTROL | 6.5 | 93.6 | 76.0 | $3.4 \times 10^7$ | $6.5 \times 10^4$ | $5.5 \times 10^4$ | — | 37 |
| 8 | 15% CKD/DIG | 8.4 | 93.9 | | $1.0 \times 10^5$ | $5 \times 10^5$ | .4 | — | 0.3 |
| 9 | 25% CKD/DIG | 8.2 | 95.2 | 62.0 | 4.9 | $1.1 \times 10^4$ | .4 | — | 0 |
| 10 | 35% CKD/DIG | 10.3 | 92.5 | | 4.9 | $2.4 \times 10^2$ | .4 | — | 0 |
| 11 | 5% LIME/DIG | 8.1 | 92.9 | | $3.5 \times 10^2$ | $3.7 \times 10^3$ | 3.65 | — | 0 |
| 12 | 10% LIME/DIG | 12.7 | 92.4 | 88.0 | 4.9 | $3.7 \times 10^3$ | .4 | — | 0 |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 46 days

TABLE III

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Eggs 5 g DWS |
|---|---|---|---|---|---|---|---|---|---|
| 1 | COMBINED CONTROL | | | | | | | | |
| 2 | | | | | | | | | |
| 3 | 25% CKD/COMB | | | | | | <0.5 | | |
| 4 | | | | | | | | | |
| 5 | 5% LIME/COMB | | | | | | 3.2 | | |
| 6 | | | | | | | | | |
| 7 | | | | | | | | | |
| 8 | | | | | | | | | |
| 9 | | | | | | | | | |
| 10 | | | | | | | | | |
| 11 | 5% LIME/DIG | | | | | | <0.5 | | |
| 12 | | | | | | | | | |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 35 days

TABLE IV

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Egg 5 g DWS |
|---|---|---|---|---|---|---|---|---|---|
| 1 | COMBINED CONTROL | 8.28 | 50.6 | 82.0 | $2.8 \times 10^6$ | $6.5 \times 10^8$ | $6.5 \times 10^6$ | — | 332 |
| 2 | 15% CKD/COMB | 8.2 | 94.4 | — | $1.9 \times 10^6$ | $3.4 \times 10^6$ | $5 \times 10^1$ | — | 8.5 |
| 3 | 25% CKD/COMB | 8.6 | 91.7 | 71.2 | $3.7 \times 10^9$ | $1.1 \times -10^6$ | $8.5 \times 10^2$ | — | 5.8 |
| 4 | 35% CKD/COMB | 10.2 | 83.4 | — | $1.2 \times 10^1$ | $1.9 \times 10^3$ | <.5 | — | 1.9 |
| 5 | 5% LIME/COMB | 8.12 | 88.9 | — | $2.0 \times 10^2$ | $4.9 \times 10^4$ | $2.7 \times 10^3$ | — | 12.0 |
| 6 | 10% LIME/COMB | 12.4 | 82.0 | 79.2 | 1.0 | $3.9 \times 10^3$ | <.5 | — | 6.5 |
| 7 | DIGEST CONTROL | 6.8 | 72.2 | 84.0 | $4.5 \times 10^6$ | $4.5 \times 10^8$ | $9.5 \times 10^6$ | — | 156.6 |
| 8 | 15% CKD/DIG | 8.4 | 94.9 | — | $4.7 \times 10^3$ | $4.9 \times 10^2$ | $1.1 \times 10^2$ | — | 19.7 |
| 9 | 25% CKD/DIG | 8.4 | 92.9 | 68.0 | 4.8 | $1.1 \times 10^4$ | 4.3 | — | 8.6 |
| 10 | 35% CKD/DIG | 10.4 | 82.1 | — | 3.2 | $2.2 \times 10^3$ | <0.5 | — | 0.8 |
| 11 | 5% LIME/DIG | 8.2 | 83.5 | — | 4.1 | $1.2 \times 10^4$ | $5.5 \times 10^2$ | — | 0.8 |
| 12 | 10% LIME/DIG | 12.4 | 80.1 | 74.0 | <.5 | $2.8 \times 10^3$ | <0.5 | — | 1.7 |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 27 days

TABLE V

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Egg 5 g DWS |
|---|---|---|---|---|---|---|---|---|---|
| 1 | COMBINED CONTROL | 8.9 | 41.6 | 86.4 | $2.4 \times 10^7$ | $4.4 \times 10^8$ | $>7.5 \times 10^6$ | — | 378 |
| 2 | 15% CKD/COMB | 8.3 | 74.7 | — | $6.0 \times 10^6$ | $1.4 \times 10^8$ | $>4.3 \times 10^5$ | — | 74.9 |
| 3 | 25% CKD/COMB | 10.0 | 75.1 | 68.8 | $3.5 \times 10^1$ | $1.4 \times 10^5$ | $>4.3 \times 10^4$ | — | 35.5 |

TABLE V-continued

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Egg 5 g DWS |
|---|---|---|---|---|---|---|---|---|---|
| 4 | 35% CKD/COMB | 11.5 | 70.4 | — | $3.2 \times 10^2$ | $2.6 \times 10^2$ | $>7.0 \times 10^2$ | — | 9.4 |
| 5 | 5% LIME/COMB | 12.4 | 50.8 | — | $3.2 \times 10^4$ | $6.5 \times 10^4$ | $>9.5 \times 10^2$ | — | 55.7 |
| 6 | 10% LIME/COMB | 12.4 | 52.7 | 84 | 0.8 | $6.0 \times 10^3$ | $>9.0 \times 10^2$ | — | 20.3 |
| 7 | DIGEST CONTROL | 8.9 | 34.9 | 84 | $7 \times 10^7$ | $4.6 \times 10^7$ | $>1.2 \times 10^6$ | — | 351.9 |
| 8 | 15% CKD/DIG | 8.9 | 80.4 | — | $2 \times 10^3$ | $4.0 \times 10^5$ | $>8.5 \times 10^4$ | — | 63.0 |
| 9 | 25% CKD/DIG | 9.9 | 76.1 | 67.2 | 0.6 | $4.2 \times 10^4$ | $>1.1 \times 10^3$ | — | 17.6 |
| 10 | 35% CKD/DIG | 12.3 | 72.8 | — | 4.7 | $2.5 \times 10^3$ | $>1.1 \times 10^3$ | — | 9.2 |
| 11 | 5% LIME/DIG | 12.4 | 59.3 | — | 8 | $1.2 \times 10^4$ | $>2.0 \times 10^2$ | — | 80.7 |
| 12 | 10% CIME/DIG | 12.4 | 59.5 | 80.8 | 8 | $5.5 \times 10^3$ | $>2.0 \times 10^2$ | — | 15.7 |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 13 days

TABLE VI

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Egg 5 g DWS |
|---|---|---|---|---|---|---|---|---|---|
| 1 | COMBINED CONTROL | 8.8 | 29.9 | 88.0 | $5.5 \times 10^7$ | $1.3 \times 10^8$ | $1.3 \times 10^6$ | 0 | 445.6 |
| 2 | 15% CKD/COMB | 10.0 | 51.0 | | $9.5 \times 10^5$ | $2.8 \times 10^7$ | $5.0 \times 10^4$ | — | 201.4 |
| 3 | 25% CKD/COMB | 11.3 | 54.4 | 70.0 | 0.6 | $5.0 \times 10^3$ | $7.5 \times 10^2$ | 0 | 107.8 |
| 4 | 35% CKD/COMB | 12.5 | 65.8 | | 0.5 | $7.5 \times 10^2$ | $3.3 \times 10^1$ | — | 27.8 |
| 5 | 5% LIME/COMB | 12.3 | 46.8 | | 0.7 | $8.5 \times 10^2$ | 0.7 | — | 96.3 |
| 6 | 10% LIME/COMB | 12.3 | 46.2 | 76.8 | 0.7 | $8.0 \times 10^0$ | 0.7 | 0 | 57.7 |
| 7 | DIGEST CONTROL | 8.6 | 36.1 | 87.2 | $4.1 \times 10^7$ | $2.3 \times 10^6$ | $1.1 \times 10^6$ | — | 243.7 |
| 8 | 15% CKD/DIG | 10.2 | 49.7 | | $6.5 \times 10^1$ | $1.0 \times 10^4$ | $>5.5 \times 10^2$ | — | 155.7 |
| 9 | 25% CKD/DIG | 11.2 | 51.9 | 70.0 | $1.3 \times 10^0$ | $7.5 \times 10^2$ | $7.5 \times 10^1$ | — | 16.2 |
| 10 | 35% CKD/DIG | 11.7 | 61.7 | | 0.5 | $4.3 \times 10^2$ | $6.0 \times 10^1$ | — | — |
| 11 | 5% LIME/DIG | 12.3 | 42.8 | | 0.8 | $6.0 \times 10^2$ | $9.0 \times 10^1$ | — | 130.5 |
| 12 | 10% LIME/DIG | 12.4 | 42.8 | 76.0 | 0.8 | $5.0 \times 10^2$ | $9.0 \times 10^1$ | — | 105.6 |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 7 days

TABLE VII

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Egg 5 g DWS |
|---|---|---|---|---|---|---|---|---|---|
| 1 | COMBINED CONTROL | 7.3 | 31.61 | 78.0 | $6.5 \times 10^8$ | $1.3 \times 10^7$ | $4.0 \times 10^5$ | $3.3 \times 10^4$ | 520.5 |
| 2 | 15% CKD/COMB | 11.7 | 44.9 | | $3.4 \times 10^6$ | $9.0 \times 10^6$ | $8.0 \times 10^4$ | — | 130.5 |
| 3 | 25% CKD/COMB | 12.7 | 51.3 | 80.0 | $1.2 \times 10^2$ | $1.5 \times 10^2$ | $7.0 \times 10^1$ | 0 | 99.6 |
| 4 | 35% CKD/COMB | 12.9 | 59.2 | | $5.5 \times 10^2$ | $1.7 \times 10^3$ | $6.0 \times 10^2$ | — | 448.5 |
| 5 | 5% LIME/COMB | 12.4 | 36.7 | | $2.1 \times 10^1$ | $1.1 \times 10^4$ | <1.2 | — | 54.4 |
| 6 | 10% LIME/COMB | 12.4 | 43.7 | 84.0 | $4.5 \times 10^0$ | $1.7 \times 10^2$ | <1.2 | 0 | 61.0 |
| 7 | DIGEST CONTROL | 7.6 | 34.8 | 90.0 | $2.2 \times 10^7$ | $2.2 \times 10^6$ | $6.5 \times 10^4$ | — | 99.3 |
| 8 | 15% CKD/DIG | 11.7 | 44.4 | | $2.8 \times 10^2$ | $1.4 \times 10^4$ | $1.3 \times 10^1$ | — | — |
| 9 | 25% CKD/DIG | 12.5 | 55.1 | 74.0 | $1.1 \times 10^2$ | $1.4 \times 10^3$ | <0.9 | — | 43.6 |
| 10 | 35% CKD/DIG | 13.0 | 60.5 | | $1.0 \times 10^1$ | $2.7 \times 10^3$ | <0.9 | — | 42.9 |
| 11 | 5% LIME/DIG | 12.2 | 38.2 | | $1.6 \times 10^1$ | $2.0 \times 10^3$ | <1.3 | — | — |
| 12 | 10% LIME/DIG | 12.4 | 46.1 | 82.0 | $1.3 \times 10^1$ | $1.3 \times 10^3$ | <1.1 | — | 58.6 |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 1 day

TABLE VIII

| Tub # | Treatment | ph | % Solids | Volume/ 100 gS | # FC/ 5 g DWS* | # FS 5 g DWS | # Sal/ 5 g DWS | # Virus/ 5 g DWS | # V Ascaris Egg 5 g DWS |
|---|---|---|---|---|---|---|---|---|---|
| 1 | COMBINED CONTROL | 5.9 | 30.9 | 92.0 ml | $9.7 \times 10^6$ | $7.8 \times 10^5$ | $1.5 \times 10^4$ | $2.0 \times 10^6$ | n = 582.4 |
| 2 | 15% CKD/COMB | 11.5 | 33.2 | — | $9.7 \times 10^6$ | $7.8 \times 10^5$ | $1.5 \times 10^4$ | — | — |
| 3 | 25% CKD/COMB | 12.5 | 42.9 | 76.0 ml | $9.7 \times 10^6$ | $7.8 \times 10^5$ | $1.5 \times 10^4$ | — | — |
| 4 | 35% CKD/COMB | 12.8 | 45.3 | — | $9.7 \times 10^6$ | $7.8 \times 10^5$ | $1.5 \times 10^4$ | — | — |
| 5 | 5% LIME/COMB | 12.3 | 49.4 | — | $9.7 \times 10^6$ | $7.8 \times 10^5$ | $1.5 \times 10^4$ | — | — |
| 6 | 10% LIME/COMB | 12.4 | 49.4 | 74.0 ml | $9.7 \times 10^6$ | $7.8 \times 10^5$ | $1.5 \times 10^4$ | — | — |
| 7 | DIGEST CONTROL | 7.0 | 34.6 | 88.0 ml | $1.8 \times 10^7$ | $4.1 \times 10^5$ | $5.2 \times 10^4$ | — | — |
| 8 | 15% CKD/DIG | 11.7 | 35.5 | — | $1.8 \times 10^7$ | $4.1 \times 10^5$ | $5.2 \times 10^4$ | — | — |
| 9 | 25% CKD/DIG | 12.4 | 37.0 | — | $1.8 \times 10^7$ | $4.1 \times 10^5$ | $5.2 \times 10^4$ | — | — |
| 10 | 35% CKD/DIG | 12.7 | 39.1 | — | $1.8 \times 10^7$ | $4.1 \times 10^5$ | $5.2 \times 10^4$ | — | — |
| 11 | 5% LIME/DIG | 12.4 | 40.2 | — | $1.8 \times 10^7$ | $4.1 \times 10^5$ | $5.2 \times 10^4$ | — | — |
| 12 | 10% LIME/DIG | 12.4 | 46.9 | — | $1.8 \times 10^7$ | $4.1 \times 10^5$ | $5.2 \times 10^4$ | — | — |

Dry weight sludge; FC = Fecal coliforms; FS = Fecal streptococci; Sal = *Salmonella enteritidis typhimurium*; # V Ascaris eggs = Viable *Ascaris suum* eggs; # Virus = Viable enterovirus; COMBINED CONTROL = Untreated combined sludge; CKD/COMB = Combined sludge treated with cement kiln dust; LIME/COMB = Combined sludge treated with Lime; DIGEST CONTROL = Untreated digested sludge; CKD/DIG = Digested sludge treated with cement kiln dust; LIME/DIG = Digested sludge treated with lime. - Elapsed Time 0 days The above results are disclosed and claimed in U.S. patent application Ser. No. 019,888, filed Feb. 27, 1987, having a common assignee with the present invention.

In accordance with the present invention, it has been found that the method can be optimized to achieve optimum results. In accordance with the present invention, the method comprises advanced alkaline stabilization with subsequent accelerated drying.

Definitions:

1. Alkaline Materials. Cement kiln dust (CKD), lime kiln dust (LKD), quicklime fines, pulverized lime, or hydrated lime in the preferred forms disclosed in Appendix A. Alternative alkaline materials may be substituted in whole or in part if they meet performance criteria shown below. 2. Advanced Alkaline Stabilization with Subsequent Accelerated Drying.

Alternative #1: Sufficient addition of the alkaline materials described above to produce the following specifications:

The amount of alkaline materials added is sufficient to achieve a pH of greater than 12 and to hold the pH of greater than 12 for at least seven (7) days. Thorough mixing sufficient to achieve hydrolysis within the sludge cake is required. The advanced alkaline stabilized sludge is then dried, for example, as by aeration, for at least 30 days and until a minimum solids concentration of 65% solids is reached. The amount of alkaline materials is sufficient that the sludge solids will achieve at least 60% solids by weight before the pH drops below 12.0.

Alternative #2: Sufficient addition of alkaline materials plus predetermined heat described above to produce the following specifications:

The amount of alkaline materials added is sufficient to achieve a pH of greater than 12 and to hold a pH of greater than 12 for at least 72 hours. Thorough mixing sufficient to achieve hydrolysis with the sludge cake is required. Concurrent with this high pH, the sludge is heated to a temperature of at least about 50° C., but not at a temperature sufficient to cause sterilization. Sufficient heat is added so that the sludge when stored in a static condition will be maintained at a temperature of at least 50° C. for at least 12 hours. The temperature increase may be obtained using exothermic reactions from the alkaline materials or from other thermal processes. Stabilized sludge is then dried by aeration until a minimum solids concentration of 50% solids is achieved.

When mixed or blended with sludge, the fine alkaline materials described above not only provide uniform intimate contact with sludge to maintain an unfavorable biochemical environment but also have large specific surface area which can provide sorptive odor control and accelerated drying rates. The process will reduce vector attraction and reduce pathogens to below detectable limits. Specifically, the process, advanced alkaline stabilization with subsequent accelerated drying, will achieve a maximum of approximately 1 PFU (plaque forming unit) of animal viruses per 100 ml of sludge, 3 CFR (colony forming units) of pathogenic bacteria (salmonella) per 100 ml of sludge when sludge is equivalent to approximately 5 grams of dry solids per 100 ml.

The fine CKD, LKD, lime materials (as described in Appendix A) are uniformly mixed into either liquid sewage sludge or dewatered sewage sludge cake. Uniform and thorough additions are achieved utilizing either mechanical or aeration mixing (wet sludges), or mechanical mixing (dewatered sludges) to produce advanced alkaline stabilized treated sludge. If the resulting sludge is in cake form, the air drying process described below is directly initiated. However, if the resulting sludge is in liquid form, it is dewatered while pH still exceeds 12 utilizing conventional thickening/filtering process technology to an intermediate solids level to produce a handlable cake material (approximately 15-50% solids). The alkaline materials are added in sufficient quantity to ensure elevation of pH greater than 12 and mixing should be sufficiently thorough as to cause hydrolysis of the sludge.

Alternative #1:

The advanced alkaline stabilized dewatered sludge cake is then air dried (while pH remains above 12 for at least seven days) through intermittent turning of windrows or other drying processes at least thirty (30) days and until the solids levels reach and maintain a minimum of 65% solids. The amount of alkaline materials is sufficient to maintain the pH above 12 until the solids level exceeds 60%.

Alternative #2:

The advanced alkaline stabilized dewatered sludge cake is heated while the pH exceeds 12 using exothermic reactions from the alkaline materials or other thermal processes to achieve a temperature of at least about 50° C. throughout the sludge, but not at a temperature sufficient to cause sterilization, and stored in static condition in such a manner as to maintain said temperature for at least 12 hours. The heat-treated advanced alkaline stabilized dewatered sludge cake is then air dried (while pH remains above 12 for at least three days) through intermittent turning of windrows or other drying processes until the solids levels reach and maintain a minimum of 50% solids.

The PFRP product resulting from the process as specified and described above can be ultimately utilized through marketing/distribution channels, land application programs, or as a landfill cover material.

Experiments have been conducted as follows:

Experiment 1.

In this experiment, 5000 g samples of Toledo sludge were mixed with 15%, 25% or 35% cement kiln dust or 5% or 10% lime. The mixture was kept at 72° F. at approximately 20% humidity for over 60 days. The results showed that drying of the sludge was improved with the CKD and that PFRP criteria were met for each microbial standard with the 25% and 35% CKD and for the 10% lime. The pH of the sludge/CKD mixture stayed above 12 for three days. The odor control on the sludge treated with 35% CKD was better than any other treatment and was quite satisfactory. The microbial results can be summarized as follows: (Numbers represent viable counts per 5 gm of dry weight of sludge.) (No regrowth of pathogens occurred after the days listed.)

| *Salmonella typhimurium* | Fecal coliforms |
|---|---|
| 0 days = 1.5 × 10 | 0 days = 9.7 × 10 |
| 28 days = <1 | 13 days = 3.2 × 10 |
| Poliovirus | Fecal streptococci |
| 0 days = 2.0 × 10 | 0 days = 7.8 × 10 |
| 1 day = <1 | 13 days = 2.6 × 10 |
| 7 days = <1 | 46 days = 6.5 × 10 |
| *Ascaris suum* eggs | |
| 0 days = | |

42 days = <1

ND

Experiment 2.

This experiment compared lab and field treatments of Monroe, Michigan, sludge with 35% CKD. The field windrows were arranged 3 sets of 10 units of 7 tons each. The microbiology was conducted on the middle set of windrows that received mixing with a "Brown Bear" twice a week. The mean temperature was about 45° F. and the humidity showed a mean of about 65%. Drying in the field was very poor with solids reaching 54% at 28 days and 72% only after 64 days. The pH of the windrows remained above 12 for over 28 days. At 64 days the pH had fallen to 10.6. The odor control was very good immediately following the CKD addition. The microbiology can be summarized as follows:

| Salmonella typhimurium | Fecal coliforms |
|---|---|
| 0 days = 104 | 0 days = 8.9 × 10 |
| 28 days = <0.3 | 1 day = 7.9 × 10 |
| Poliovirus | 7 days = <0.3 |
| 0 days = 0 | Fecal streptococci |
| 1 day = 0 | 0 days = 2.4 × 10 |
| Ascaris suum eggs | 1 day = 2.1 × 10 |
| 0 days = <1 | 14 days = 2.8 × 10 |
| 1 day = <1 | |
| 7 days = <1 | |

Experiment 3.

Sludges from three cities were separately tested as described below.

a. Des Moines, Iowa

Municipal sludge was mixed with 30% CKD. Drying at 7 days reached 65% solids while the pH remained above 12. Odor control with the CKD was excellent. The microbiology can be summarized as follows:

| Salmonella typhimurium | Fecal coliforms |
|---|---|
| 0 days = <2 | 0 days = 2.4 × 10 |
| 7 days = <2 | 7 days = 2 |
| Poliovirus | Fecal streptococci |
| 0 days = ND | 0 days = 2.4 × 10 |
| 7 days = ND | 7 days = 2.3 × 10 |
| Ascaris suum eggs | |
| 0 days = 2.4 | |
| 7 days = <1 | | b. Dupage County, Ill.

Municipal sludge was mixed with lime kiln dust at 35%. Drying was good reaching 63% in 2 weeks and 85% in 5 weeks. The pH had fallen to 9.0 at 2 weeks and 7.2 at 5 weeks. The odor control was good at 2 weeks and excellent at 5 weeks. The microbiology can be summarized as follows:

| Salmonella typhimurium | Fecal coliforms |
|---|---|
| 0 days = ND | 0 days = 2.3 × 10 |
| 14 days = ND | 14 days = 2 |
| 35 days = ND | 35 days = 22 |
| Poliovirus | Fecal streptococci |
| ND | ND |
| Ascaris suum eggs | | c. Toledo sludge treated at Sylvania Township, Ohio

Approximately 550 tons of Toledo's municipal sludge was treated with 6% lime fines at the treatment plant following which it was trucked to the Sylvania site where it was mixed with 35% CKD and mixed in windrows (8' wide, 3.5' high, 200' long) on a 3 times a week basis with a "Brown Bear". The weather conditions were wet and summer temperatures averaged about 80° F. The drying was good reaching 64% solids in 30 days and 69% in 60 days. The pH remained above 12 for over 60 days and only fell to 11.2 at 90 days. The odor control was good initially and very good after 30 days. The microbiology can be summarized as follows:

| Salmonella typhimurium | Fecal coliforms |
|---|---|
| 0 days = 1.4 × 10 | 0 days = 1.1 × 10 |
| 30 days = <2 | 30 days = 2 |
| 60 days = <2 | 60 days = <2 |
| Poliovirus | Fecal streptococci |
| ND | 0 days = 3.0 × 10 |
| Ascaris suum eggs | 30 days = <2 |
| 0 days = 20 | 60 days = 20 |
| 30 days = <1 | |
| 60 days = <1 | |

Experiment 4.

Municipal sludge from Toledo was brought to the Medical College for mixing (25000 g per cooler) with "bag house" quicklime and/or CKD in the following percentages:

1. Control 0%;
2. 35% CKD 3. 6% lime +35% CKD;
4. 10% lime +35% CKD
5. surface application of 35% CKD
6. 20% lime The purpose of using these combinations was to measure temperatures achieved and determine if incubation times could be shortened in order for treated sludges to reach PFRP standards. Maximum temperatures recorded were as follows for each of the above: 1 (25° C.); 2 (38° C.); 3 (46° C.); 4 (58° C.); 5 (25° C.); and 6(87° C.). The maximal temperatures of the limed samples could have been higher given optimal mixing conditions since additional mixings soon after lime additions reduced temperatures. Drying was good reaching 52% in the CKD only treated samples in 14 days and exceeding 64% in all others. The pH remained above 12 for 24 hours in the CKD (#2) sample and remained above 12 for over 56 days in all others. Odor control was good in all treated samples. The microbiology can be summarized as follows:

| Salmonella typhimurium | Fecal coliforms |
|---|---|
| 0 days = 2.4 × 10 | 0 days = 4.8 × 10 |
| 3 days | 3 days |
| #2 = 3.5 × 10 | #2 = 1.3 × 10 |
| #3 = <1 | #3 = <1 |
| #4 = <1 | #4 = <1 |
| #6 = <1 | #6 = <1 |
| Poliovirus | Fecal streptococci |
| ND | 0 days = 8.7 × 10 |
| | 3 days |
| | #2 = 3.0 × 10 |

-continued

| | |
|---|---|
| #3 = | 2.3 × 10 |
| #4 = | 3.0 × 10 |
| #6 = | <1 |

*Ascaris suum* eggs
0 days = 145

| 1 day | 7 days | 28 days |
|---|---|---|
| #1 = 64 | #1 = 88 | #1 = 152 |
| #2 = 19 | #2 = 13 | #2 = <1 |
| #3 = <1 | #3 = <1 | #3 = <1 |
| #4 = <1 | #4 = <1 | #4 = <1 |
| #6 = <1 | #6 = <1 | #6 = <1 |

Experiment 5.

In this experiment, 6% or 8% "bag house" quicklime was added to Toledo municipal sludge at the treatment plant and then this mixture was incubated in storage bins for a minimum of 12 hours. Temperatures did not drop below 52° C. with the 6% lime or 56° C. with the 8% lime over the 12 hours. After this incubation, the limed sludge (approximately 50 tons) was trucked to the Toledo Port Authority site for mixing with 35% CKD and then mixed twice weekly with the "Brown Bear". The drying was good reaching 58% in 14 days and 60% in 28 days with the 6% lime treated mixture and 54% in 14 days and 63% in 28 days with the 8% lime treatment mixture. The pH of the 6% lime treated mixture was over 12 for 66 days and in the 8% lime mixture it was over 12 for the 28 days of the test. Odor control once the 35% CKD was mixed in was very good. In order to adequately test the killing power of the two-stage lime/CKD process, a cloth bag containing sludge and the correct treatment mixture (8% lime followed by 35% CKD) was seeded with Ascaris eggs and inserted directly into the incubation bin and subsequent windrow. The microbiology can be summarized as follows:

| *Salmonella typhimurium* | Fecal coliforms |
|---|---|
| 6% L + 35% CKD | 6% L + 35% CKD |
| 0 days = <1 | 0 days = 2.8 × 10 |
| 1 day = <1 | 1 day = <1 |
| 14 days = <1 | 14 days = <1 |
| 8% L + 35% CKD | 8% L + 35% CKD |
| 0 days = <1 | 0 days = 2.8 × 10 |
| 1 day = <1 | 1 day = <1 |
| Poliovirus | Fecal streptococci |
| ND | 6% L + 35% CKD |
| *Ascaris suum* eggs | 0 days = 8.9 × 10 |
| 6% + 35% CKD | 1 day = <1 |
| days = 2 | 14 days = <1 |
| 1 day = <1 | 8% + 35% CKD |
| 14 days = <1 | 0 days = 2.8 × 10 |
| 8% L = 35% CKD | 1 day = <1 |
| 0 days - 137 (seeded) | 14 days = <1 |
| 1 day = <1 | |
| 14 days = <1 | |

The above results shows conclusively that the treatment process using CKD or lime/CKD in a two-stage process both cause the treated municipal sludges to meet the PFRP criteria. The specific treatment determines the processing time necessary for the sludge (when seeded with 1 ×10 Salmonella and 1 ×10 Ascaris eggs) to reach PFRP levels. The process and process times are as follows:
1. CKD only - always within 46 days
2. 6% lime +35% CKD, no heat - 30 days
3. 6% lime +35% CKD with 46° C./12 hrs - 3 days
4. 6% or 8% lime +35% CKD with 52° C./12 hrs - 1 day Further tests have shown that the method results in a stabilization of heavy metals.

APPENDIX A

Material Specifications
    Quick Lime:
    Shall meet specifications for quicklime as identified in ASTM C 911. At least 75% of the material shall pass a #100 sieve.
    Hydrated Lime:
    Shall meet specifications for hydrated lime as identified in ASTM C 911. At least 75% of the material shall pass a #200 sieve.
    Kiln Dust:
    Material collected in a rotary kiln producing portland cement or quicklime in accordance with ASTM C 150 and ASTM C 911, respectively.
    In an oxide analysis the material must contain at least a total of 35% CAo and Mgo. The loss on ignition shall not exceed 30%. Reactive alkalines and alkalis (CAo +Mgo - [LOI ×1.2]+K2o +Na2o) shall exceed 12%.
Maximum allowable levels of trace elements:
    cadmium (Cd): 25 mg/kg
    copper (Cu): 500 mg/kg
    lead (Pb) 900 mg/kg
    nickel (Ni) 100 mg/kg
    mercury (Hg) 5 mg/kg
    zinc (ZN) 1500 mg/kg
At least 75% of the material shall pass the #100 sieve.
At least 50% of the material shall pass the #200 sieve.
    We claim:
    1.
    A method of treating wastewater sludge to provide a fertilizer for agricultural lands which can be applied directly to the lands which consists essentially of the following steps:
        mixing said sludge with at least one alkaline material;
        wherein the amount of added material mixed with said sludge being sufficient to raise the pH of said mixture to at least 12 and to hold the pH of greater than 12 for at least 7 days,
        and drying said mixture for at least 30 days and until a minimum solids concentration of 65% solids is reached,
        the amount of added material being also sufficient to maintain the pH above 12 until the sludge solids achieve at least 60% solids by weight,
        the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacteria therein to less than three colony forming units per 100 ml of said sludge; to reduce parasites therein to less than one viable egg per 100 ml of said sludge; to reduce vector attraction to said sludge; and to prevent significant regrowth of the pathogenic microorganisms.
    2.
    The method set forth in claim 1 wherein the added material comprises kiln dust and the amount of added material comprises about 35% by weight of the sludge to reduce the odor to a level that is tolerable in a closed room even though the pH may drop below 9 during the drying, and maintain that odor control indefinitely even though said mixture is exposed to climatic conditions.

3. The method set forth in claim 1 wherein the amount of added material mixed with said sludge and the length of time of drying is sufficient to reduce the odor to a level that is tolerable in a closed room even though the pH may drop below 9 during the drying, and maintain that odor control indefinitely even though said mixture is exposed to climatic conditions.

4. The method set forth in claim 1 wherein the alkaline material is selected from the group consisting of lime, cement kiln dust and lime kiln dust to form a mixture.

5. A method of treating wastewater sludge to provide a fertilizer for agricultural lands which can be applied directly to the lands which consists essentially of the following steps:

mixing said sludge with at least one alkaline material;

wherein the amount of added material mixed with said sludge being sufficient to raise the pH of said mixture to at least 12 for at least 72 hours, concurrently with the high pH heating the mixture to at least 50° C., but not at a temperature sufficient to cause sterilization, the amount of heat being sufficient that the sludge stored in a static condition will be maintained at a temperature of at least 50° C. for at least 12 hours, the amount of added material mixed with said sludge and the length of time of drying being sufficient to reduce significantly offensive odor of the sludge to a level that is tolerable; to reduce animal viruses therein to less than one plaque forming unit per 100 ml of said sludge; to reduce pathogenic bacteria therein to less than three colony forming units per 100 ml of said sludge; to reduce parasites therein to less than one viable egg per 100 ml of said sludge; to reduce vector attraction to said sludge; and to prevent significant regrowth of the pathogenic microorganisms.

6. The method set forth in claim 5 wherein the added material comprises kiln dust and the amount of added material comprises about 35% by weight of the sludge to reduce the odor to a level that is tolerable in a closed room even though the pH may drop below 9 during the drying, and maintain that odor control indefinitely even though said mixture is exposed to climatic conditions.

7. The method set forth in claim 6 wherein the amount of added material mixed with said sludge and the length of time of drying is sufficient to reduce the odor to a level that is tolerable in a closed room even though the pH may drop below 9 during the drying, and maintain that odor control indefinitely even though said mixture is exposed to climatic conditions.

8. The method set forth in claim 5 wherein the alkaline material is selected from the group consisting of lime, cement kiln dust and lime kiln dust to form a mixture.

* * * * *